(12) United States Patent
Nagata

(10) Patent No.: US 6,967,751 B2
(45) Date of Patent: Nov. 22, 2005

(54) IMAGE SENSOR, AND IMAGE PROCESSING APPARATUS AND INFORMATION PROCESSING SYSTEM USING THE SAME

(75) Inventor: Kenji Nagata, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 09/867,732

(22) Filed: May 30, 2001

(65) Prior Publication Data

US 2002/0030858 A1 Mar. 14, 2002

(30) Foreign Application Priority Data

May 30, 2000 (JP) ........................... 2000-160227
May 15, 2001 (JP) ........................... 2001-145221

(51) Int. Cl.⁷ ............................. H04N 1/04; H04N 1/46; H01L 27/00
(52) U.S. Cl. ................ 358/482; 358/483; 358/484; 358/514; 358/512; 358/513; 250/208.1
(58) Field of Search .................. 358/482, 483, 358/484, 514, 512, 513, 474, 497, 496; 250/208.1

(56) References Cited

U.S. PATENT DOCUMENTS

| | | | | |
|---|---|---|---|---|
| 5,489,992 A | * | 2/1996 | Endo | 358/482 |
| 5,796,928 A | * | 8/1998 | Toyomura et al. | 358/1.6 |
| 6,137,102 A | | 10/2000 | Späth et al. | 250/214.1 |
| 6,195,183 B1 | * | 2/2001 | Fujimoto et al. | 358/514 |
| 6,198,551 B1 | * | 3/2001 | Tabata | 358/514 |
| 6,563,611 B1 | * | 5/2003 | Kao | 358/498 |

FOREIGN PATENT DOCUMENTS

| | | |
|---|---|---|
| JP | 5-56214 | 3/1993 |
| JP | 10-93748 | 4/1998 |
| JP | 10-329185 | 12/1998 |
| JP | 11-77696 | 3/1999 |
| JP | 11-92672 | 4/1999 |
| JP | 2000-124623 | 4/2000 |
| TW | 380251 | 10/1998 |

* cited by examiner

Primary Examiner—Edward Coles
Assistant Examiner—Houshang Safaipour
(74) Attorney, Agent, or Firm—Morgan & Finnegan, LLP

(57) ABSTRACT

This invention has as its object to provide an image sensor which can effectively attain higher read resolution, and an image processing apparatus and information processing system using the same. To achieve this object, function members including a light source (6) for irradiating an object to be read (PP) with light, a sensor (3) for receiving light reflected by the object to be read (PP), and an imaging element (7) for forming an image of the reflected light on a light-receiving portion of the sensor (3) are attached to and supported by a support member (1) to have a predetermined positional relationship. In order to assure high attachment positional precision and rigidity for the function members, the support member (1) is formed to have a hollow shape. The support member (1) is formed to have the hollow shape along its longitudinal direction. Two side portions of the support member (1) are formed to have a hollow shape, and are coupled at end portions in the longitudinal direction.

13 Claims, 14 Drawing Sheets

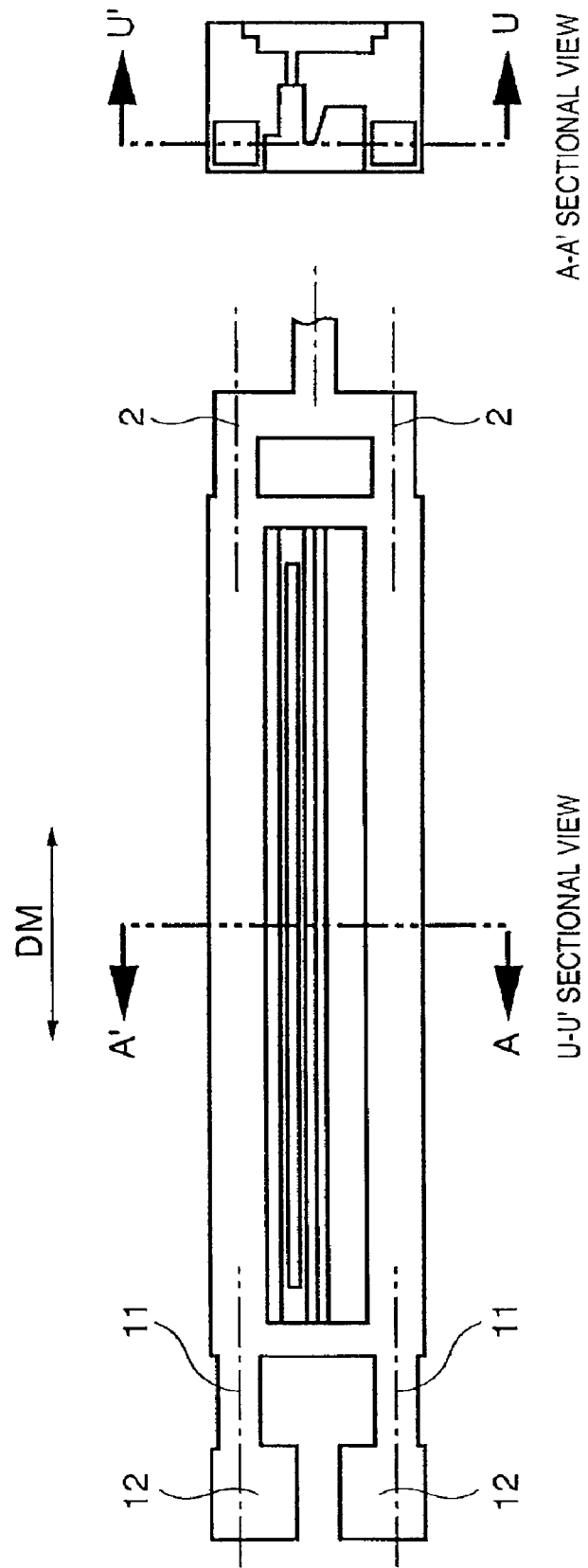

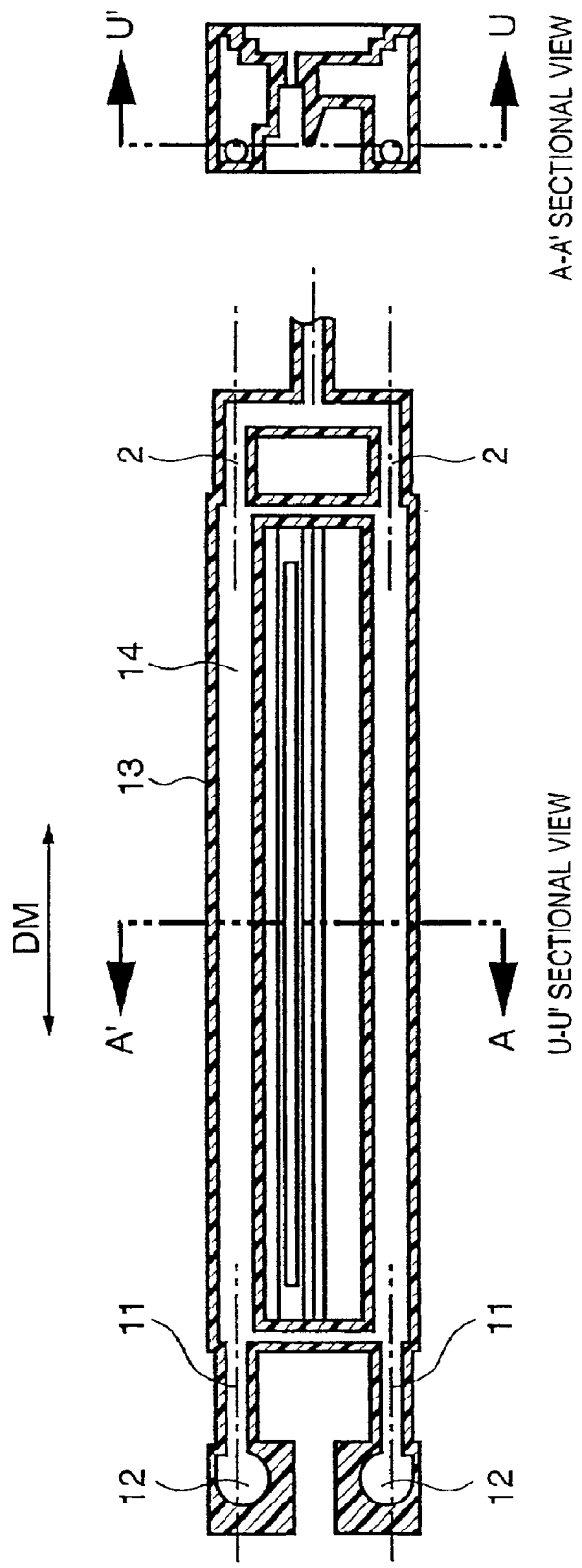

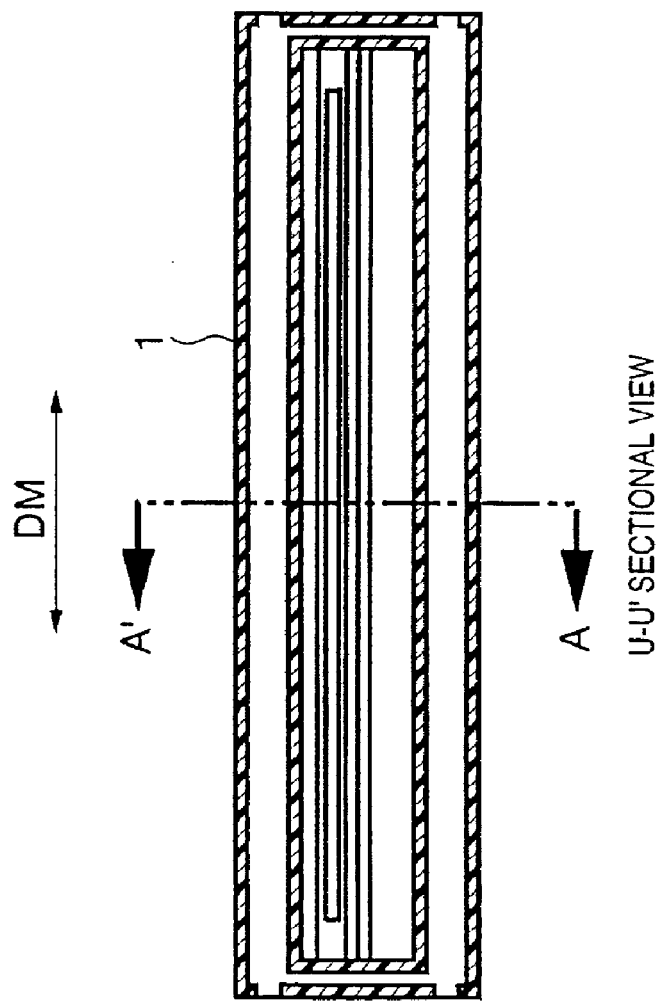
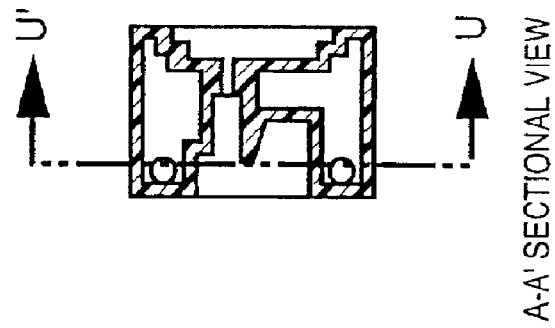
FIG. 6A
FIG. 6B
U-U' SECTIONAL VIEW
A-A' SECTIONAL VIEW

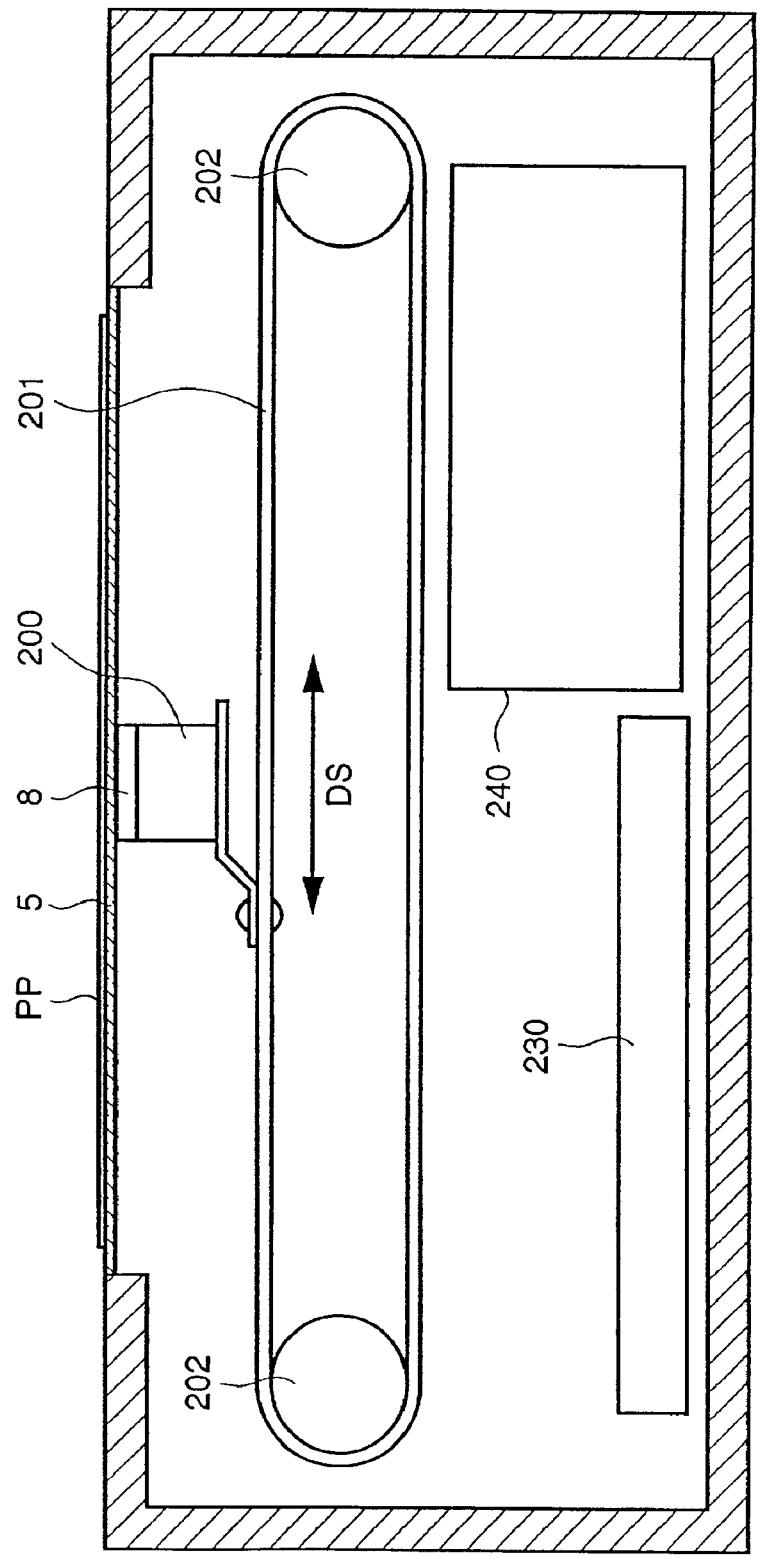

IMAGE SENSOR, AND IMAGE PROCESSING APPARATUS AND INFORMATION PROCESSING SYSTEM USING THE SAME

FIELD OF THE INVENTION

The present invention relates to an image sensor for reading light reflected by a document surface to be read (object to be read) using a sensor, and an image processing apparatus and information processing system using the same.

BACKGROUND OF THE INVENTION

Conventionally, an image sensor which has a sensor array for performing photoelectric conversion, an imaging element for imaging light coming from a document on the sensor array, and a light source for illuminating the document is known.

FIG. 12 is a schematic perspective view showing the outer appearance of the conventional image sensor. Referring to FIG. 12, reference numeral 1 denotes a frame as a support member; and 5, a top plate glass which can contact a document PP and serves as a transparent member that specifies the read surface. Reference numeral 8 denotes spacers which contact the transparent member 5 to define the position of the sensor with respect to the read position. Most photosensors (pixels) line up in a main scan direction DM that agrees with the longitudinal direction of the frame 1, the widthwise direction of which agrees with a sub-scan direction DS.

FIG. 13 shows a section taken along a lone C–C' in FIG. 12. Referring to FIG. 13, an imaging element 7 is set in a space D of the frame 1. A light source 6 is set in a space E. A sensor array 3 is arranged on an electric circuit board 4, and is set to face a space F. The spaces D, E, and F communicate with one another. Other spaces L and M are unfilled spaces which are formed upon forming the frame 1 by solid molding to prevent sink marks.

FIG. 14 is a sectional view showing other unfilled spaces of the conventional image sensor. In FIG. 14, spaces N, Q, R, and S are unfilled spaces.

Such image sensor is assembled as follows. That is, the light source 6 is fixed to a mount surface G of the frame 1 by an adhesive or screws, and the imaging element 7 is inserted into the space D and is fixed to a mount surface H of the frame 1 by an adhesive or screws. Then, the electric circuit board 4 provided with the sensor array 3 is fixed to a mount surface I of the frame 1 by an adhesive or screws.

However, in order to achieve still higher read resolution of the conventional image sensor, the following technical problems remain unsolved.

1. The flatness precision of a document and the image sensor is important to realize higher read resolution. However, it is hard for conventional molding of the frame 1, which is formed to have an unfilled shape that forms large openings on its outer surface, to obtain a frame thickness that can assure good molding balance with the flatness. Furthermore, since space L- and M-side blocks, which are partitioned by the space D as the optical path of optical information coming from the document PP, suffer variations in frame thickness, such variations in thickness of the frame 1 cause molding shrinkage variations. For these reasons, formation of a high-precision flat surface required for the frame 1 is limited, and it is difficult to form a high-precision flat surface having flatness of 0.1 mm or less over the total length of the image sensor in the main scan direction DM.

2. In order to realize higher read resolution, the frame 1 must have high rigidity so that it does not deform by a pressure T of a pressing means which prevents the image sensor or document PP from floating. However, upon conventional molding of the frame 1 which is formed to have an unfilled shape that forms large openings on its outer surface, the openings readily collapse, and the rigidity obtained with the frame 1 is limited.

SUMMARY OF THE INVENTION

The present invention has been made in consideration of the above situation, and has as its object to provide an image sensor which can effectively attain higher read resolution, and an image processing apparatus and information processing system using the same.

In order to solve the aforementioned problems and to achieve the above object, an image sensor according to the present invention is characterized by the following arrangement.

That is, an image sensor in which function members including a light source for irradiating an object to be read with light, a sensor for receiving light reflected by the object to be read, and an imaging element for forming an image of the reflected light on a light-receiving portion of the sensor are attached to and supported by a support member to have a predetermined positional relationship, is characterized in that the support member is formed to have a hollow shape.

An image processing apparatus of the present invention is characterized by reading and processing image information from an object to be read using the image sensor.

An information processing system of the present invention is characterized by comprising the image processing apparatus, and an external information processing apparatus for controlling the image processing apparatus.

According to the present invention, the unfilled shape of the frame is formed to have a hollow shape. As a result, it becomes easier to obtain the frame thickness which can assure good molding balance with flatness, and a frame with high-precision flatness, which is free from any influences of shrinkage upon frame molding can be formed.

Since the need for forming openings of the unfilled shape can be obviated, the frame never collapses at its openings, and the frame rigidity can be improved.

Furthermore, since no complicated unfilled shape need be adopted, simple metal molds can be used, which are advantageous for metal mold cost and metal mold service life.

Since the image sensor can have a flat outer surface, good outer appearance can be assured, and such sensor is easy to handle.

In this manner, a frame having high-precision flatness and high rigidity which can effectively achieve higher read resolution of the image sensor can be formed.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 3A and 3B are sectional views showing gas assist molding used to form a hollow unfilled portion;

FIGS. 5A and 5B are sectional views showing gas assist molding used to form a hollow unfilled portion;

FIGS. 6A and 6B are sectional views showing gas assist molding used to form a hollow unfilled portion;

FIG. 7 is a schematic sectional view of an image information processing apparatus using a flatbed type image sensor according to an embodiment of the present invention;

DETAILED DESCRIPTION OF THE PREFERRED EMBODIMENTS

Figure 1:
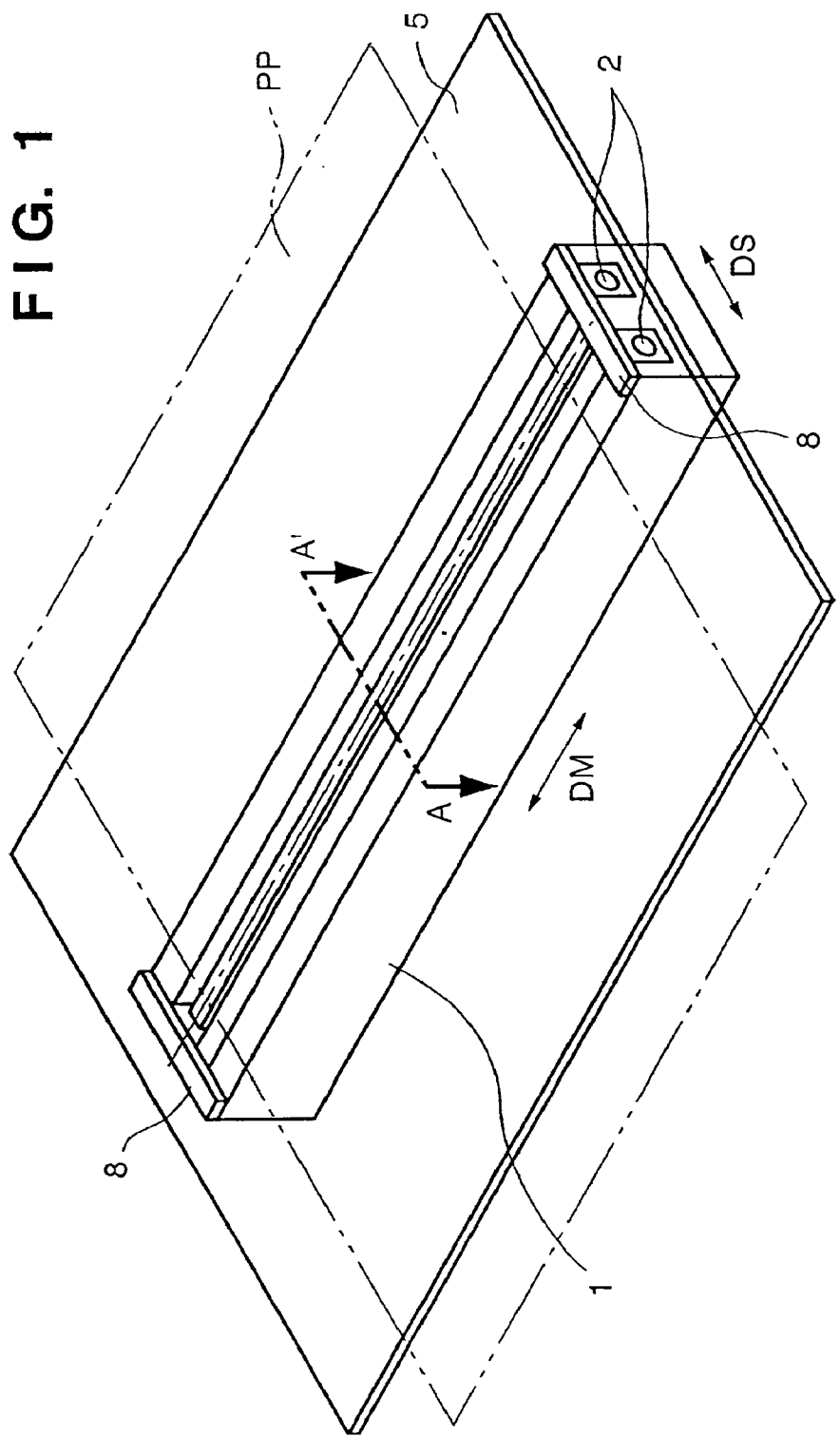
FIG. 1 is a schematic perspective view of an image sensor according to the present invention.

Preferred embodiments of an image sensor according to the present invention will be described hereinafter with reference to the accompanying drawings. Note that the same reference numerals denote substantially the same members as those in the conventional structure, and a description thereof will be omitted.

Figure 2:
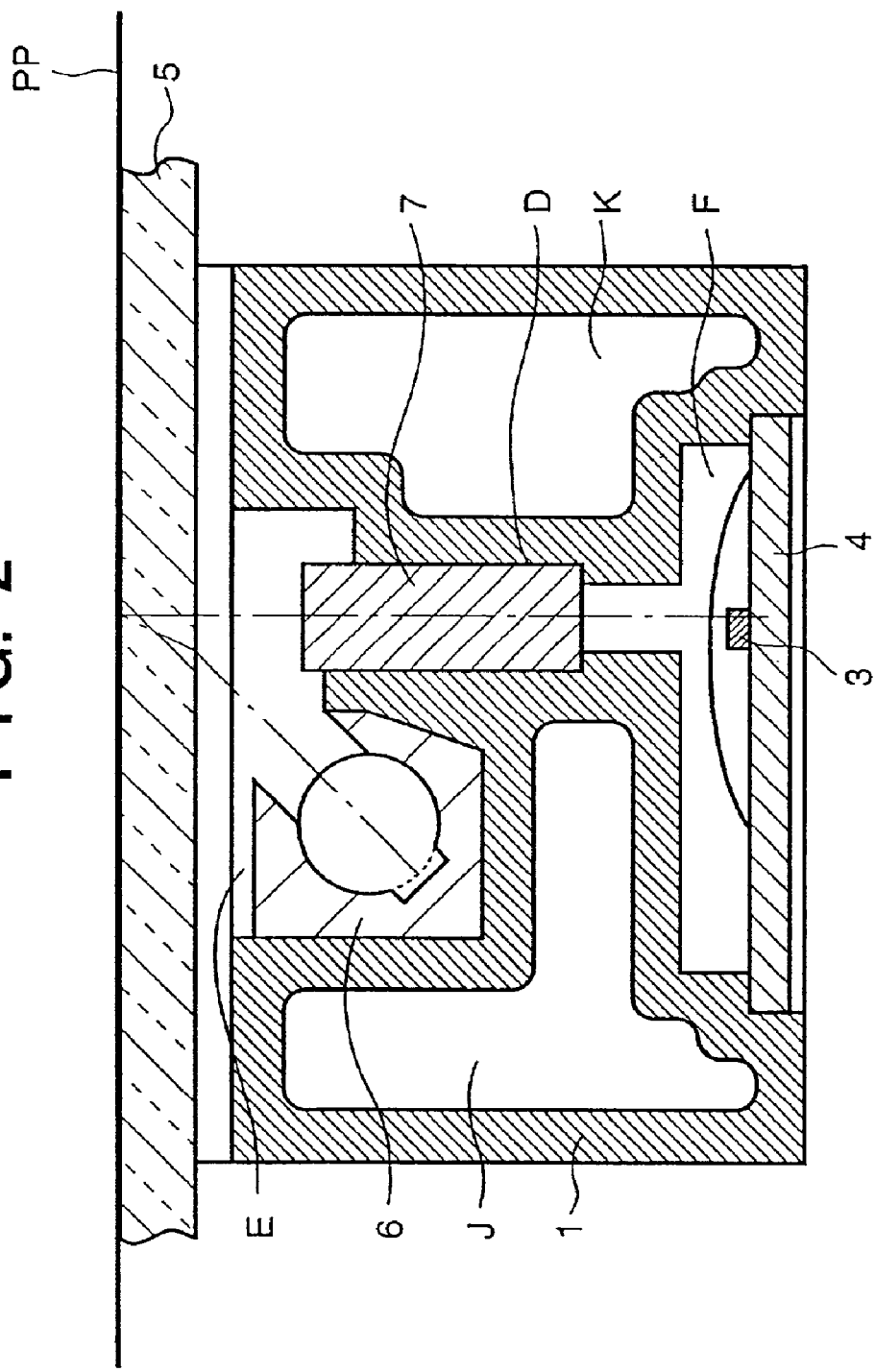
FIG. 2 is a sectional view taken along a line A–A' in FIG. 1.

FIG. 1, FIG. 2, and FIGS. 3A to 6B best illustrate the feature of the present invention. FIG. 1 is a schematic perspective view showing the outer appearance of an image sensor. FIG. 2 is a sectional view taken along a line A–A' in FIG. 1. FIGS. 3A to 6B are sectional views showing gas assist molding used to form a hollow unfilled portion.

Referring to FIG. 2, a frame 1 (support member) is formed to have hollow spaces J and K. Such hollow unfilled spaces can be formed by gas assist molding. In FIG. 1, reference numeral 2 denotes molding gates for gas assist molding, which also serve as gas injection holes.

A method of forming the frame 1 by gas assist molding will be explained below.

Figure 4B:
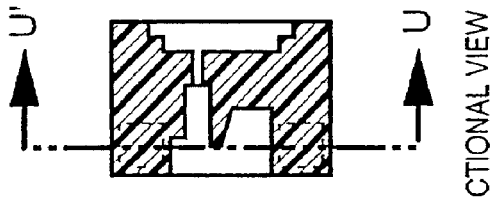
FIGS. 4A and 4B are sectional views showing gas assist molding used to form a hollow unfilled portion.
Figure 4A:
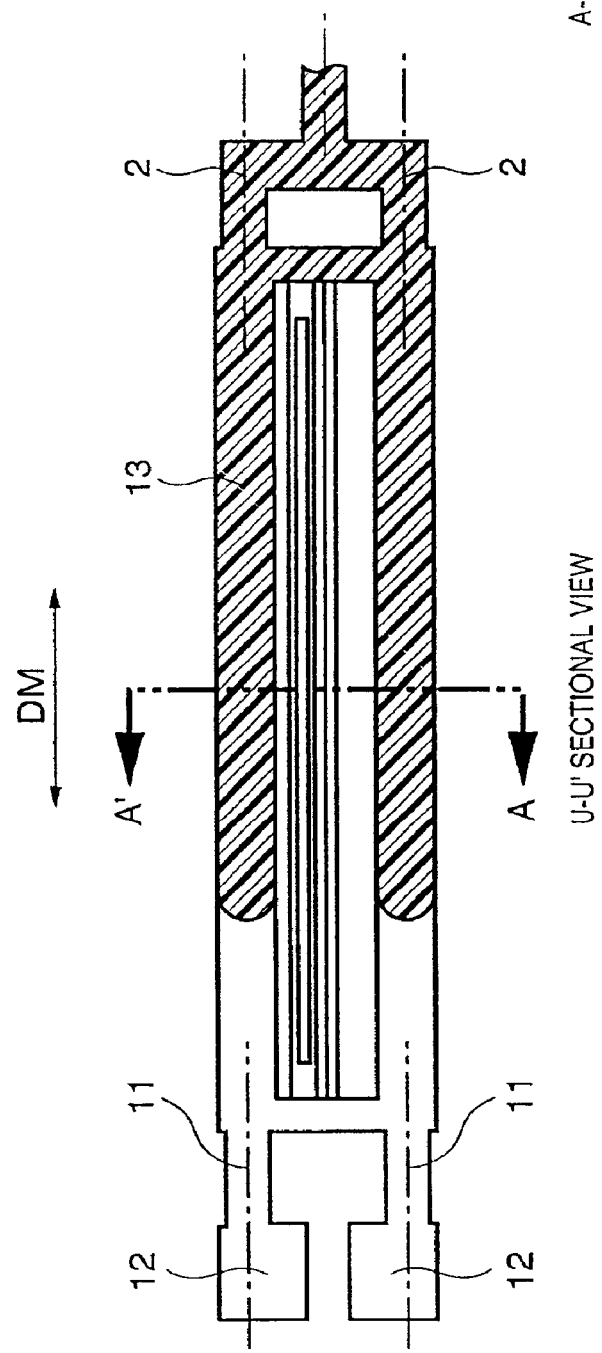

FIGS. 3A and 3B show the state of metal molds before molding, FIGS. 4A and 4B show the state of the metal molds upon completion of resin injection, FIGS. 5A and 5B show the states of the metal molds and frame 1 upon completion of gas injection, and FIGS. 6A and 6B show the state of the completed hollow frame 1. In each pair of figures, B shows the A–A' section of A, and A shows the U–U' section of B.

In FIGS. 3A and 3B, reference numeral 2 denotes molding gates which also serve as glass injection holes, and are formed on one end face of the frame 1 in the longitudinal direction DM. On the opposite end face, residual resin vent holes 11 for exhausting residual molding resin are formed, and residual resin relieve sections 12 are spaces for storing residual molding resin.

In FIGS. 4A and 4B, reference numeral 13 denotes molding resin which forms the frame 1. In FIGS. 5A and 5B, reference numeral 14 denotes gas for forming hollow spaces in the molding resin.

The frame 1 is formed in the following procedure by gas assist molding.

The molding resin 13 is injected into the metal molds shown in FIGS. 3A and 3B via the molding gates 2. The amount of resin to be injected is (amount required to form the frame 1)+(resin amount corresponding to residual resin). Then, gas is injected from the gas injection holes 2. The amount of gas to be injected is large enough to relieve residual resin into the residual resin relieve sections 12 via the residual resin vent holes 11. As shown in FIGS. 6A and 6B, after molding, the frame 1 is removed from the metal molds, and the molding gates 2 and residual resin vent holes 11 are cut, thus completing the frame 1.

The frame 1 is divided into space J- and K-side blocks by a space D serving as the optical path of optical information coming from a document PP, and the space J- and K-side blocks are formed to have a hollow shape with a frame thickness which can assure good molding balance with flatness. With this structure, the following effects are obtained.

(1) Since each of the space J- and K-side blocks is formed to have a hollow shape with a frame thickness which can assure good molding balance with flatness, high-precision flatness can be obtained by each block. The frame 1 obtained by coupling two end portions of the space J- and K-side blocks having high-precision flatness can have high-precision flatness.

(2) Since the space J- and K-side blocks are formed to have a hollow shape having no openings on the outer surface of the frame 1 unlike the unfilled space formed by conventional solid molding, the frame 1 never collapses at the openings, and the rigidity of the frame can be improved.

(3) Since no complicated unfilled shape need be adopted, simple metal molds can be used, which are advantageous for metal mold cost and metal mold service life.

(4) Since the image sensor can have a flat outer surface, good outer appearance can be assured, and such sensor is easy to handle.

FIG. 7 shows an example of a scanner as an image information processing apparatus which uses a flatbed type image sensor unit of this embodiment. Referring to FIG. 7, reference numeral 5 denotes a transparent member which can contact a document PP and defines the read surface; 8, a spacer which contacts the transparent member 5 to define the position of the sensor with respect to the read position; 201, a scan belt serving as a feed means which carries a sensor unit and scans it in a scan direction DS; 202, feed rollers for driving the scan belt; and 230, a system control board as a control means, which has a controller for controlling respective units, a driving circuit for a photoelectric conversion element, an image information processor, a transmitter, and the like. Reference numeral 240 denotes a power supply of the apparatus.

In this image information processing apparatus, an image sensor unit 200 moves in the scan direction DS with respect to a document PP placed on the transparent member 5. Upon reading image information of the document PP by this scan, since the frame 1 has high-precision flatness and high rigidity, as described, image information can be read at high read resolution.

Figure 8:
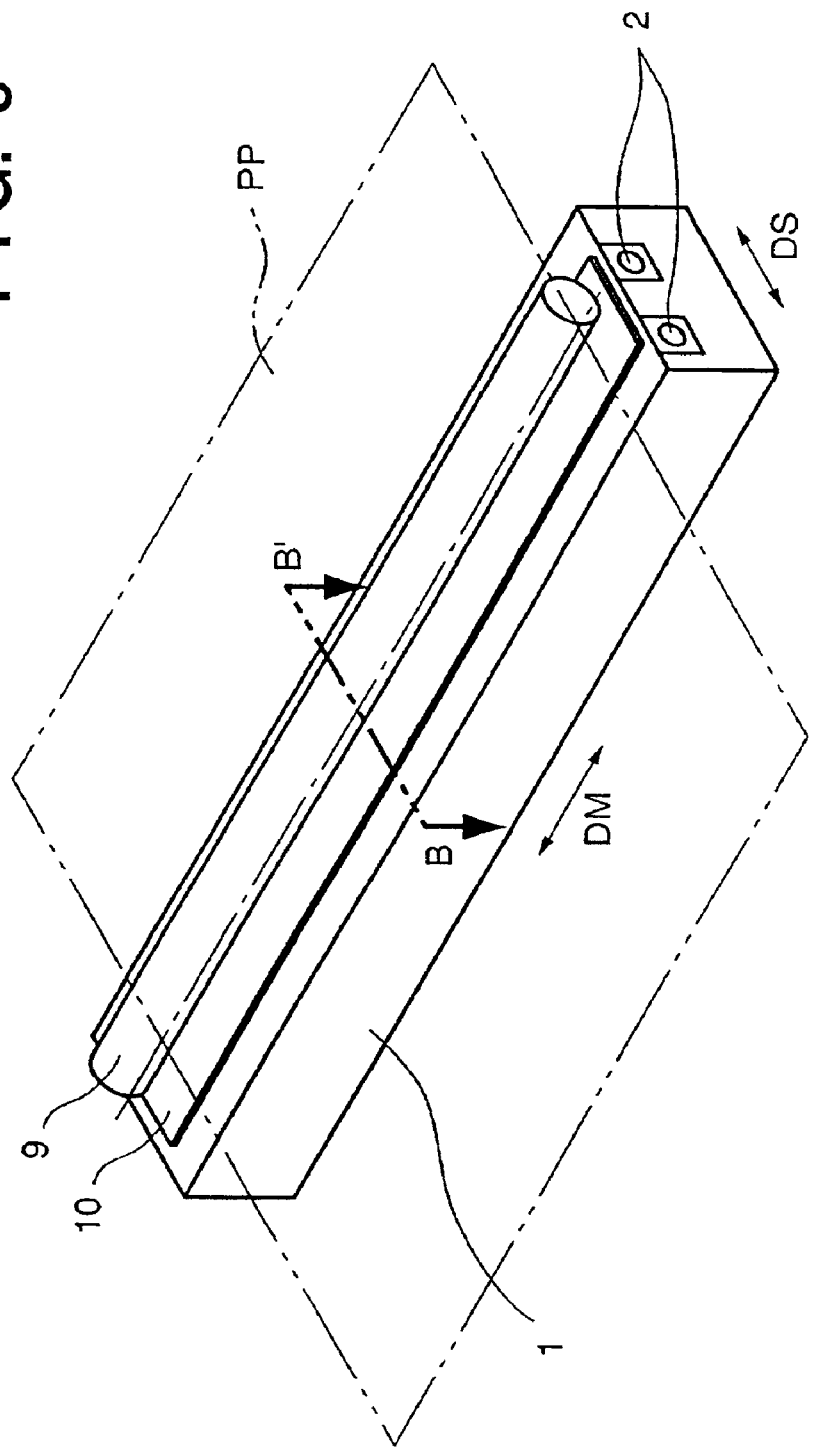
FIG. 8 is a schematic perspective view of a sheet-feeder type image sensor according to the second embodiment of the present invention.
Figure 9:
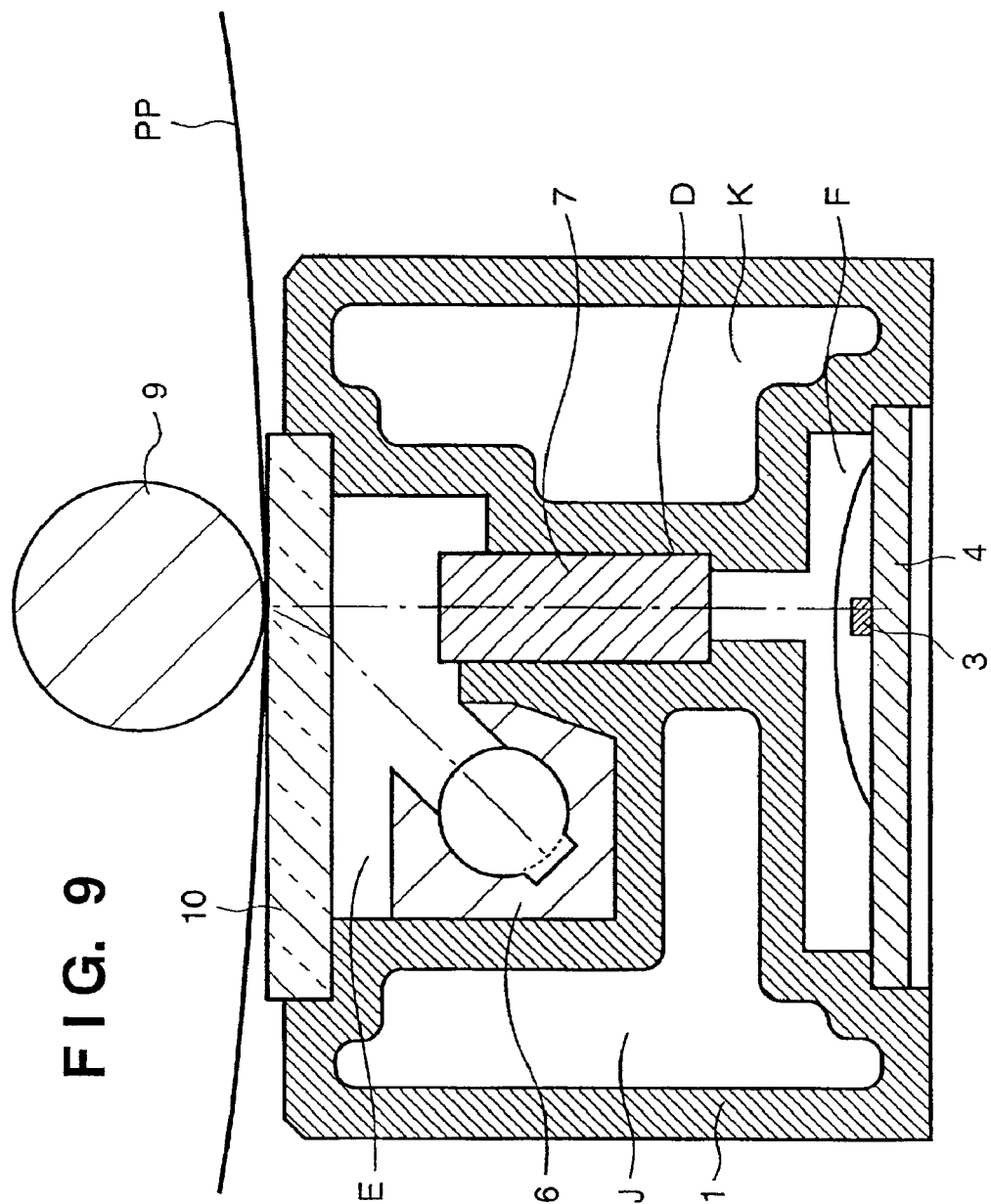
FIG. 9 is a sectional view taken along a line B–B' in FIG. 8.

FIGS. 8 and 9 show the second embodiment of the present invention, i.e., a sheet-feeder type image sensor. FIG. 8 is a schematic perspective view showing the outer appearance of the image sensor, and FIG. 9 is a sectional view taken along a line B–B' in FIG. 8.

Referring to FIG. 8, reference numeral 10 denotes a transparent member which is attached to the frame 1 at a position where it can contact a document PP. Reference numeral 9 denotes a roller for conveying the document PP. In FIG. 9, the frame 1 is formed to have hollow spaces J and K.

With this arrangement, the same effects as in the first embodiment can be obtained for the sheet-feeder type image sensor.

Figure 10:
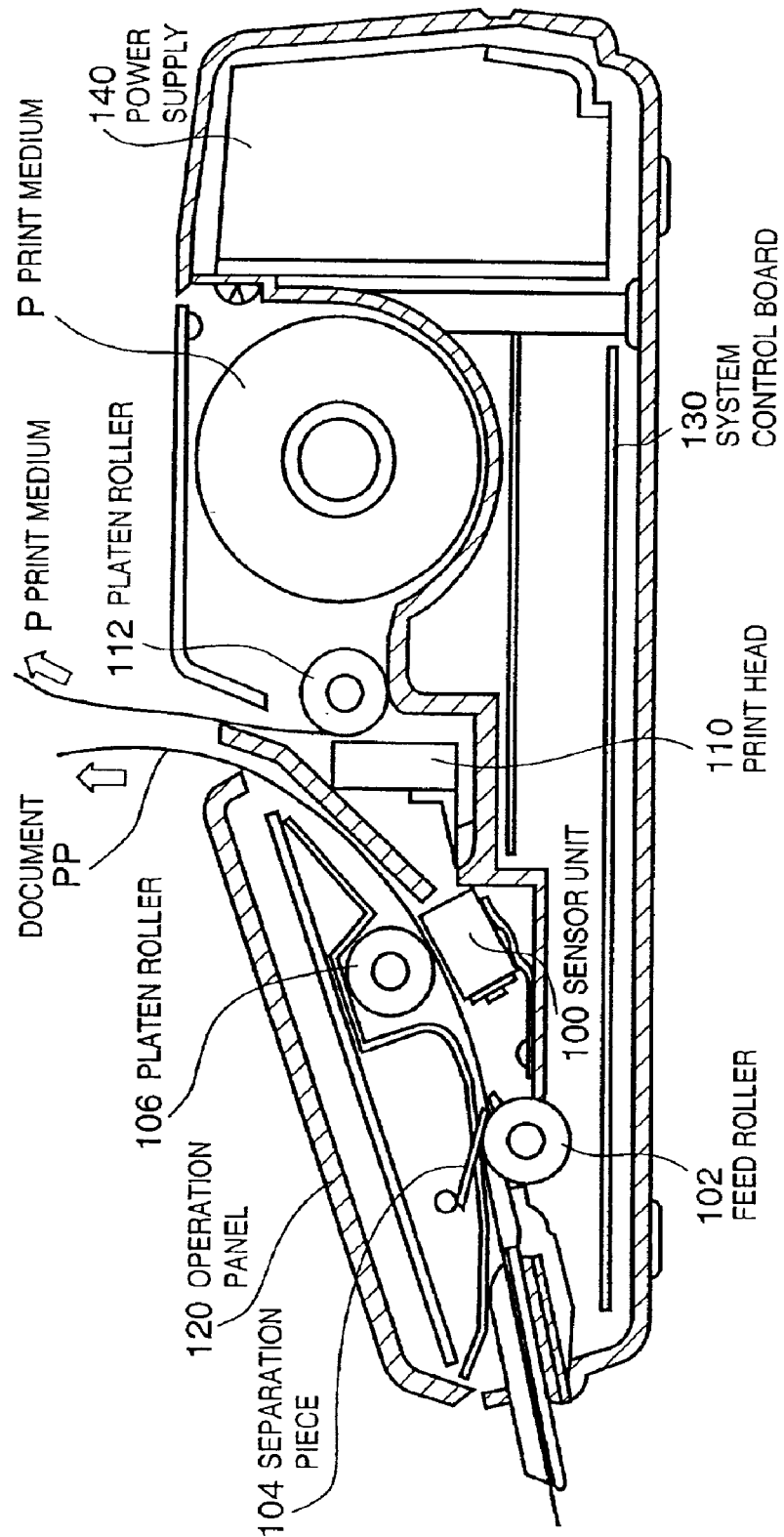
FIG. 10 is a schematic sectional view of an image information processing apparatus using a sheet-feeder type image sensor according to an embodiment of the present invention.

FIG. 10 shows an example of a facsimile apparatus having a communication function as an image information processing apparatus which uses a sheet-feeder type image sensor unit 100 according to the second embodiment of the present invention. Referring to FIG. 10, reference numeral 102 denotes a feed roller as a feed means for feeding a document PP toward the read position; and 104, a separation piece used to reliably separate and feed documents PP one by one.

Reference numeral 106 denotes a platen roller as a convey means, which is provided at the read position with respect to the sensor unit to regulate the surface to be read of the document PP and to convey the document PP. Reference symbol P denotes a print medium which is roll paper in FIG. 10. Image information read by the sensor unit or externally received image information in case of the facsimile apparatus or the like is formed on the medium P. Reference numeral 110 denotes a print head as a print means for forming an image; and 112 a platen roller as a convey means which conveys the print medium P to the print position of the print head 110 and regulates the surface to be printed of the print medium P.

Reference numeral 120 denotes an operation panel serving as input/output means which has switches for making operation inputs, a display for displaying apparatus status messages and the like, and the like. Reference numeral 130 denotes a system control board as a control means which has a controller for controlling respective units, a driving circuit for a photoelectric conversion element, an image information processor, a transceiver, and the like. Reference numeral 140 denotes a power supply of the apparatus.

In this the image information processing apparatus as well, upon reading image information on a document PP by moving the document PP, which is placed on the transparent member 10, in the scan direction DS of the image sensor unit 100, since the frame 1 has high-precision flatness and high rigidity, as described above, image information can be read at high read resolution.

Figure 11:
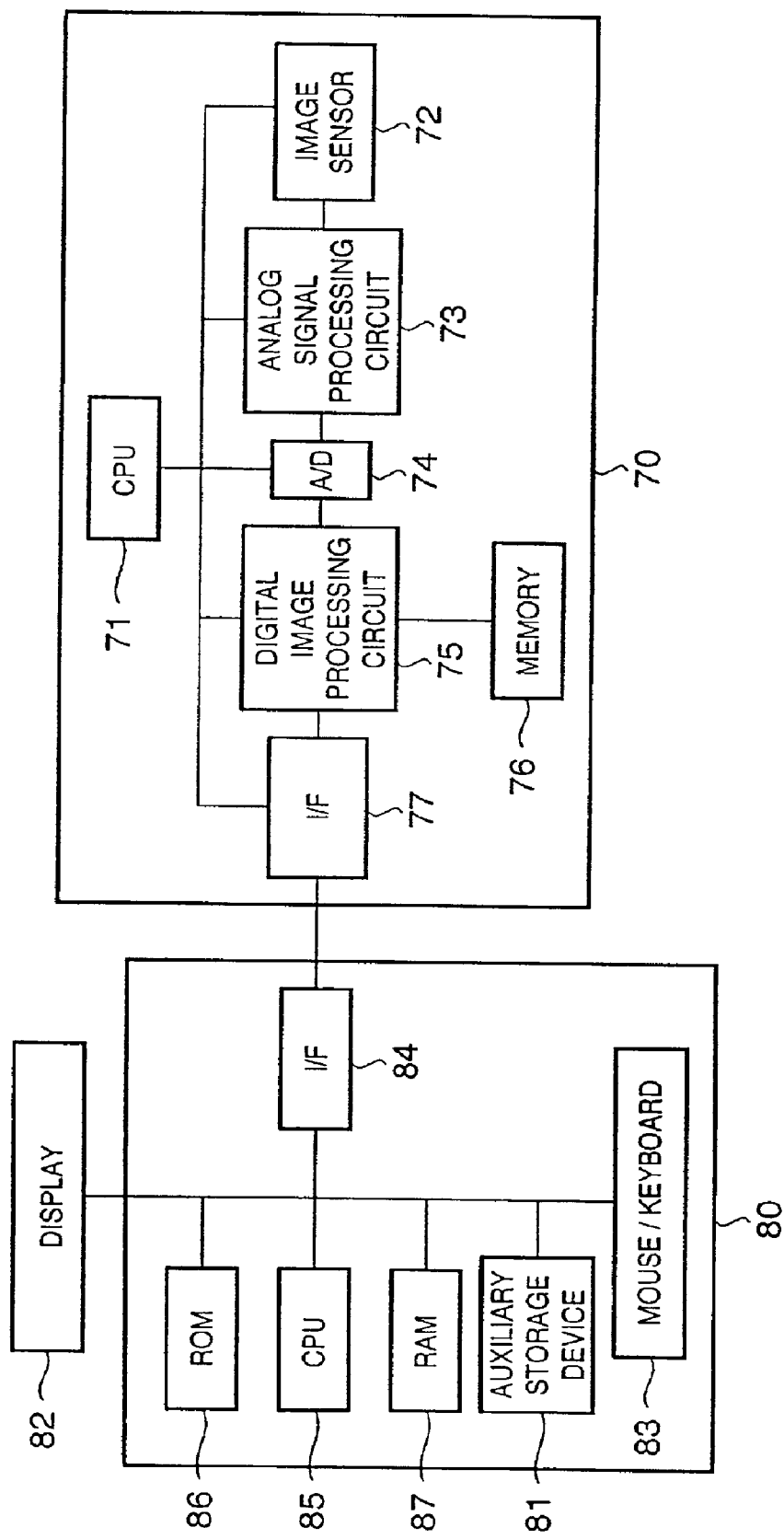
FIG. 11 is a block diagram for explaining an information processing system according to an embodiment of the present invention.
Figure 12:
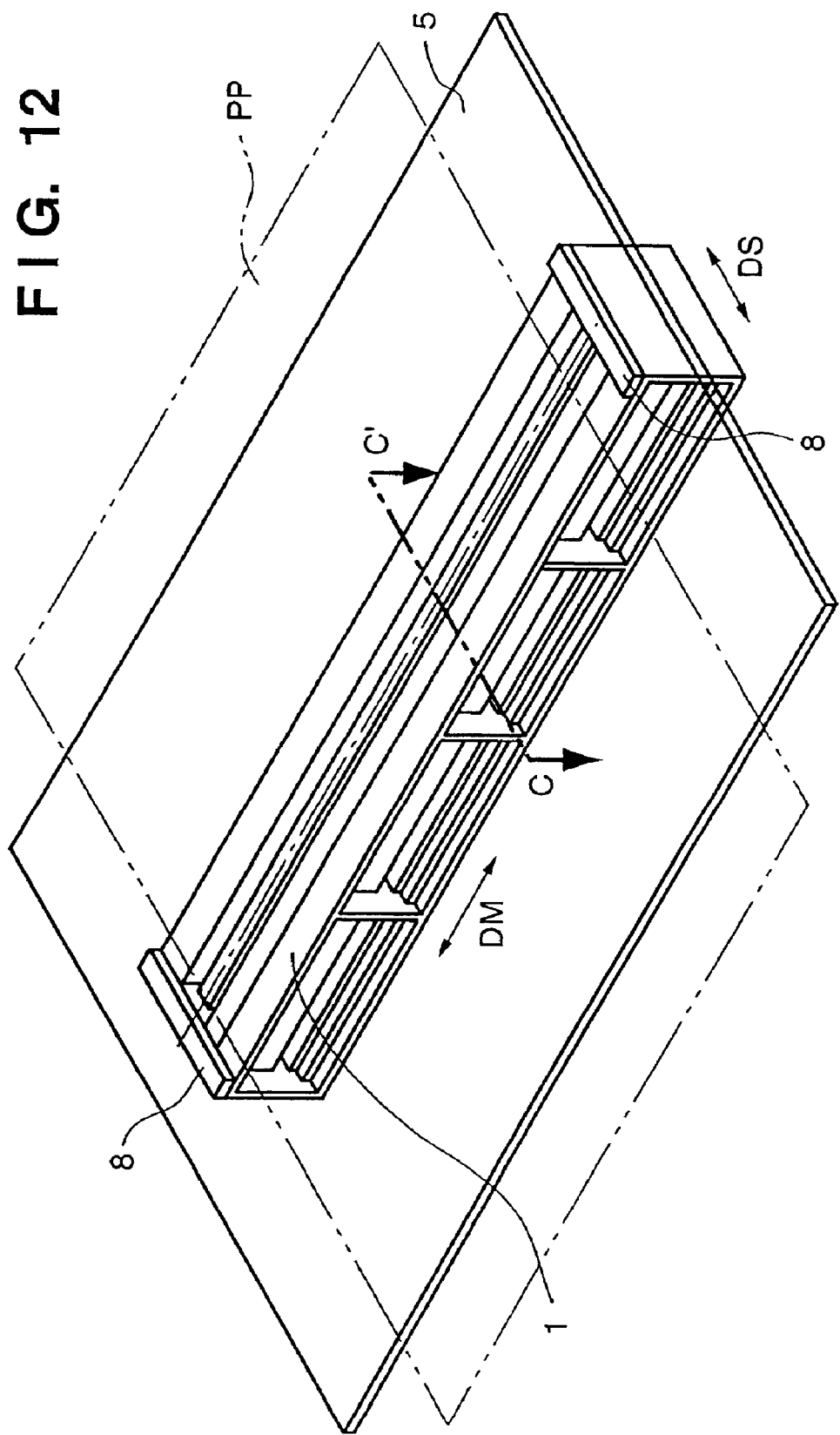
FIG. 12 is a schematic perspective view of a conventional image sensor.
Figure 13:
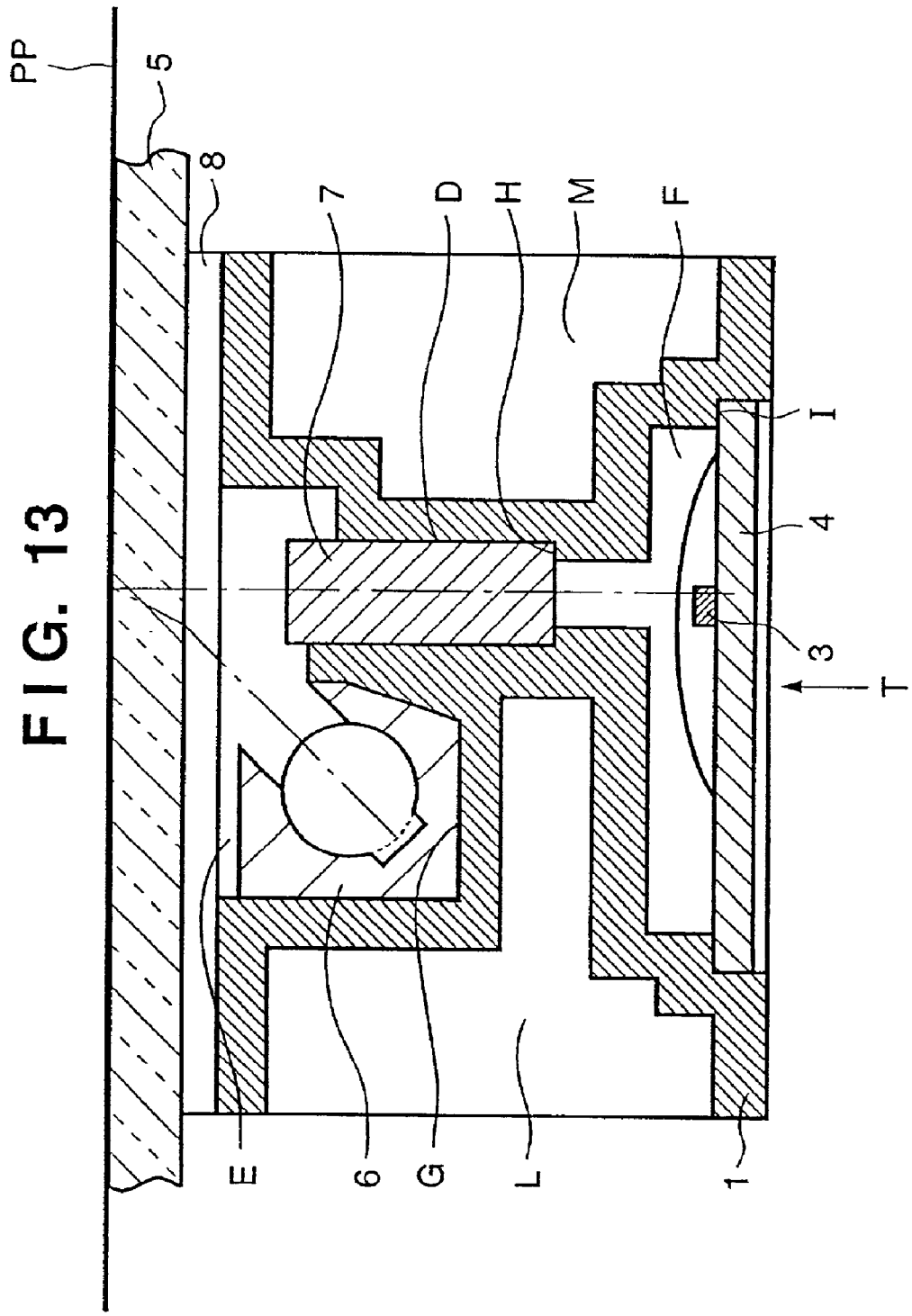
FIG. 13 is a sectional view taken along a line C–C' in FIG. 12.
Figure 14:
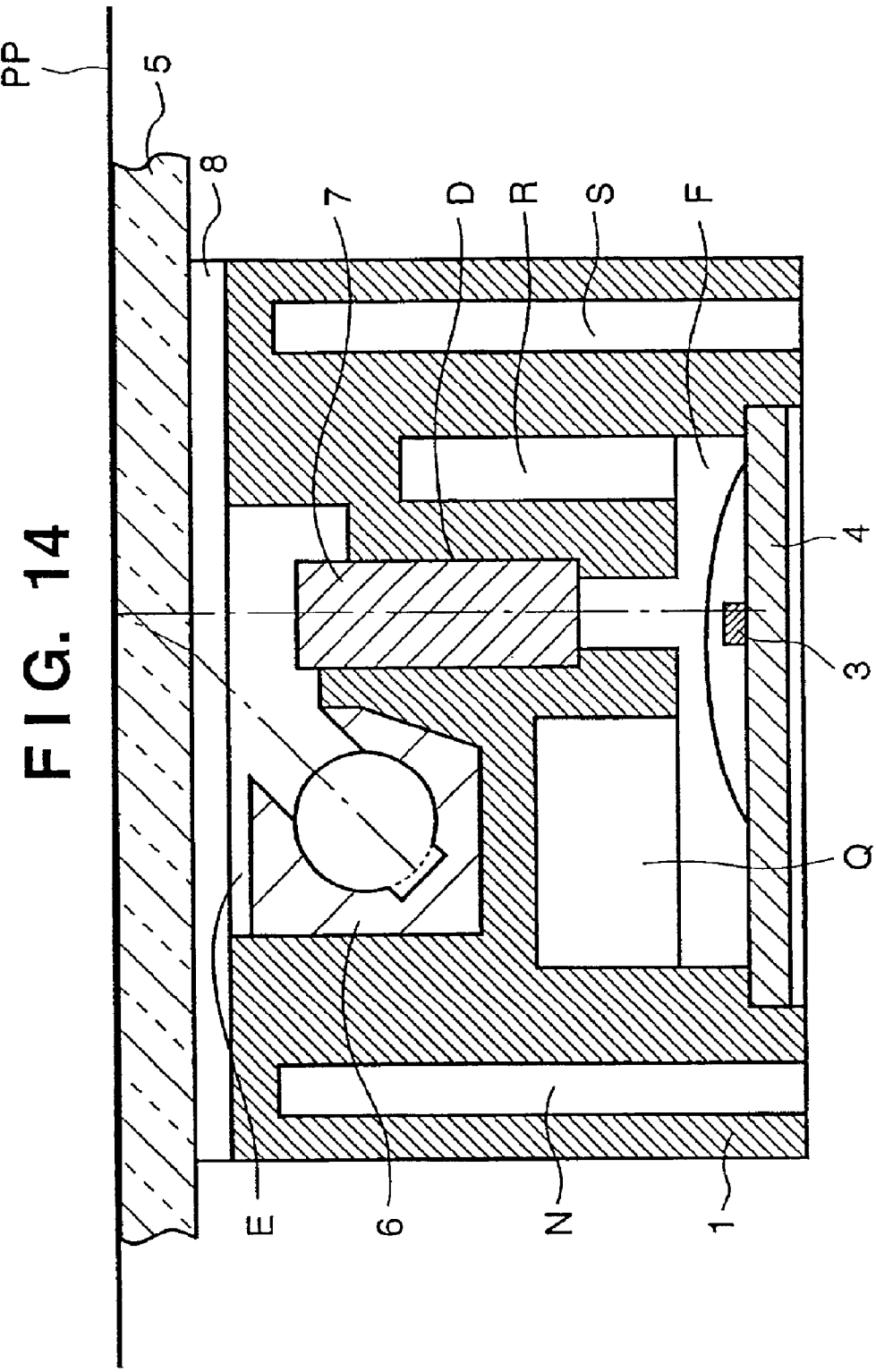
FIG. 14 is a sectional view of another prior art.

FIG. 11 shows an example of an information processing system using the image sensor described in the above embodiments. An example of the arrangement of a system which is built by connecting an image reading apparatus 70 that incorporates an image sensor 72 to a personal computer 80, and outputs read image information to the computer or a network will be explained below.

Referring to FIG. 11, reference numeral 71 denotes a CPU as a first control means for controlling the overall image reading apparatus 70; 72, an image sensor as a reading unit which comprises the light source, sensor, and the like, as described above, and converts a document image into an image signal; and 73, an analog signal processing circuit for executing an analog process such as gain adjustment or the like of an analog image signal output from the image sensor.

Reference numeral 74 denotes an A/D converter for converting the output from the analog signal processing circuit 73 into a digital signal; 75, an image processing circuit for executing image processes such as shading correction, gamma conversion, a zoom process, and the like of the output data from the A/D converter 74 using a memory 76; and 77, an interface for externally outputting digital image data that has undergone the image processes of the image processing circuit 75.

The interface 77 complies with specifications such as SCSI, Bi-Centronics, or the like, which is normally used in a personal computer, and is connected to the personal computer 80. The analog signal processing circuit 73, A/D converter 74, image processing circuit 75, and memory 76 construct a signal processing means.

The personal computer 80 as a second control means has a magnetooptical disk drive, floppy disk drive, or the like as an external storage device or auxiliary storage device 81. Furthermore, in FIG. 11, reference numeral 82 denotes a display for displaying processes on the personal computer 80; and 83, a mouse/keyboard used to input commands or the like to the personal computer. Reference numeral 84 denotes an interface for controlling exchange of data, commands, and status information of the image reading apparatus between the personal computer and image reading apparatus.

The personal computer 80 can input a read instruction to the image reading apparatus via the mouse/keyboard 83. When a read instruction is input by the muse/keyboard 83, the CPU 85 sends a read command to the image reading apparatus via the interface 84. The personal computer 80 then controls the image reading apparatus in accordance with control program information stored in a ROM 86. Note that the control program may be loaded, into the personal computer 80, from a storage medium such as a magnetooptical disk, floppy disk, or the like, which is loaded into the auxiliary storage device 81 and stores the program, and may be executed by the CPU 85.

As described above, according to the above embodiments, since a support member which is a key to determine the attachment positions of function members that form an image sensor has a hollow shape, a molding thickness which can assure good balance with flatness can be formed, thus obtaining a support member with a high-precision flat surface.

Since the need for forming large openings for an unfilled shape on the outer surface of a support member can be obviated, the support member never collapses at the openings, and the rigidity of the support member can be improved.

Since no complicated unfilled shape need be adopted, simple metal molds can be used, which are advantageous for metal mold cost and metal mold service life.

Since the image sensor can have a flat outer surface, good outer appearance can be assured, and such sensor is easy to handle.

The present invention is not limited to the above embodiments and various changes and modifications can be made within the spirit and scope of the present invention. Therefore, to apprise the public of the scope of the present invention the following claims are made.

What is claimed is:

1. An image sensor in which function members including a light source for irradiating an object to be read with light, a sensor for receiving light reflected by the object to be read, and an imaging element for forming an image of the reflected light on a light-receiving portion of the sensor are attached to and supported by a support member to have a predetermined positional relationship, wherein the support member is formed to have a hollow shape by gas assist molding.

2. The sensor according to claim 1, wherein the support member is formed to have the hollow shape except for storage spaces for the function members.

3. The sensor according to claim 1, wherein the support member is formed to have the hollow shape along a longitudinal direction thereof.

4. The sensor according to claim 3, wherein two side portions of the support member are formed to have a hollow shape, and are coupled at end portions in the longitudinal direction of the support member.

5. The sensor according to claim 1, wherein no openings are formed on two outer surfaces of the support member.

6. The sensor according to claim 1, wherein a gas injection hole and resin injection hole in the gas assist molding are identical to each other.

7. The sensor according to claim 1, wherein a gas exhaust hole and resin exhaust hole in the gas assist molding are identical to each other.

8. The sensor according to claim 1, wherein gas and resin injection holes, and gas and resin exhaust holes in the gas assist molding are respecfully formed on opposing surfaces of the support member.

9. An image processing apparatus for reading and processing image information from an object to be read using an image sensor according to claim 1.

10. The apparatus according to claim 9, wherein a flatbed type image sensor unit is used.

11. The apparatus according to claim 9, wherein a sheet-feeder type image sensor unit is used.

12. The apparatus according to claim 9, comprising driving means for changing a relative position of the image sensor along a scanning direction during scanning of the object to be read.

13. An information processing system comprising an image processing apparatus according to claim 9, and an external information processing apparatus for controlling the image processing apparatus.

* * * * *

UNITED STATES PATENT AND TRADEMARK OFFICE
CERTIFICATE OF CORRECTION

PATENT NO. : 6,967,751 B2
APPLICATION NO. : 09/867732
DATED : November 22, 2005
INVENTOR(S) : Nagata It is certified that error appears in the above-identified patent and that said Letters Patent is hereby corrected as shown below:

<u>Title page,</u>
Item [73], should read:
-- Assignee:  Canon Kabushiki Kaisha, Tokyo (JP);
              Canon Components, Inc., Saitama (JP) --.

Signed and Sealed this

Twenty-seventh Day of June, 2006

JON W. DUDAS
*Director of the United States Patent and Trademark Office*